United States Patent
Jiang et al.

(10) Patent No.: US 7,472,313 B2
(45) Date of Patent: *Dec. 30, 2008

(54) PRIMARY SERVER AND BACKUP SERVER THAT SHARE AN IP ADDRESS AND A LIMITED NUMBER OF MESSAGE IDENTIFIERS

(75) Inventors: Tsang Ming Jiang, Fremont, CA (US); Jhaanaki Krishnan, San Jose, CA (US); Weifang Yang, Santa Clara, CA (US)

(73) Assignee: Tellabs Petaluma, Inc., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/717,404

(22) Filed: Mar. 13, 2007

(65) Prior Publication Data

US 2007/0174729 A1    Jul. 26, 2007

Related U.S. Application Data

(63) Continuation of application No. 10/440,775, filed on May 19, 2003, now Pat. No. 7,228,459.

(51) Int. Cl.
*G06F 11/00*    (2006.01)
(52) U.S. Cl. ....................................... 714/43
(58) Field of Classification Search ...................... 714/6, 714/43
See application file for complete search history.

(56) References Cited

U.S. PATENT DOCUMENTS

| | | | | |
|---|---|---|---|---|
| 4,590,554 A | * | 5/1986 | Glazer et al. ................... 714/13 |
| 5,530,802 A | * | 6/1996 | Fuchs et al. .................... 714/17 |
| 5,537,642 A | | 7/1996 | Glowny et al. ................ 395/800 |
| 5,555,371 A | * | 9/1996 | Duyanovich et al. ........... 714/13 |
| 5,812,751 A | * | 9/1998 | Ekrot et al. ...................... 714/4 |

(Continued)

FOREIGN PATENT DOCUMENTS

WO    WO 98/49620    11/1998

(Continued)

OTHER PUBLICATIONS

Redback Networks, SmartEdge TM800 Router Network and Service Management, "Carrier-Class Network and Service Management Solution for Enhanced Scalability, Reliability in Multi-Vendor Networks", [online], [retrieved on May 13, 2003]. Retrieved from the Internet: <URL: http://www.redback.com/en-US/products/pdf/se-800-netop.pdf>. pp. 1-4.

(Continued)

*Primary Examiner*—Robert Beausoiel
*Assistant Examiner*—Amine Riad
(74) *Attorney, Agent, or Firm*—Mark C. Pickering

(57) ABSTRACT

A primary server and a backup server that both run a RADIUS client in a cold start configuration share a single IP address that includes a limited number of message identifiers (MIDs). The primary server and the backup server each have a small number of fixed message identifiers. In addition, a large number of shared message identifiers are used by the primary server, and then used by the backup server a predetermined time after the primary server fails.

33 Claims, 3 Drawing Sheets

U.S. PATENT DOCUMENTS

| | | | |
|---|---|---|---|
| 6,185,695 B1 * | 2/2001 | Murphy et al. | 714/4 |
| 6,246,666 B1 * | 6/2001 | Purcell et al. | 370/221 |
| 6,539,494 B1 * | 3/2003 | Abramson et al. | 714/4 |
| 6,934,875 B2 * | 8/2005 | Kashyap | 714/4 |

FOREIGN PATENT DOCUMENTS

| | | |
|---|---|---|
| WO | WO 03/017104 A1 | 2/2003 |

OTHER PUBLICATIONS

Commworks Professional Services, Application Brief, "High Availability RADIUS Proxy", [online], [retrieved on May 13, 2003]. Retrieved from the Internet: <URL: http://www.commworks.com/pdfs/professional_services/HARP_wirelessAB.pdf>. pp. 1-2.

The Stratus ftServer Family,—the World's Most Reliable Server for Window 2000, [online], [retrieved on May 13, 2003]. Retrieved from the Internet: <URL: http://www.stratus.com/products/ftserver>. pp. 1-3.

Auto Failover, "Overview" [online], [retrieved on May 13, 2003]. Retrieved from the Internet: <URL: http://www.autofailover.com/Overview/Index.html>. pp. 1-3.

OSE Systems, [online], [retrieved on May 13, 2003]. Retrieved from the Internet: <URL: http://www.ose.com/default.asp>. pp. 1.

C. Rigney et al., Remote Authentication Dial in User Service (RADIUS), Network Working Group, Request for Comments: 2138, (Apr. 1997), [online], [retrieved on May 13, 2003], Retrieved from the Internet: <URL: http://www.cis.ohio-state.edu/cgi-bin/rfc/rfc2138.html>. pp. 1-55.

RADIUS/AAA, Solutions and Resources, "Architecting Large-Scale Internet Service Provider a Carrier RADIUS Deployments Using Steel-Belted Radius/Service Provider Edition", [online], [retrieved on May 13, 2003]. Retrieved from the Internet: <URL: http://www.funk.com/Radius/Solns/arch_wp.asp>. pp. 1-21.

C. Rigney et al., Remote Authentication Dial in User Service (RADIUS), Network Working Group, Request for Comments: 2138, (Apr. 1997), [online], [retrieved on Feb. 20, 2003], Retrieved from the Internet: <URL: http://www.Ietf.org/rfc/rtc213.txt?number=2138>. pp. 1-61.

Auto Failover, FAQ How it works, [online], [retrieved on May 19, 2003]. Retrieved from the Internet: <URL: http://www.autofailover.com/Support/FAQ_How.html>. pp. 1-3.

TeleChoice.com, White Papers, [online], [retrieved on May 19, 2003]. Retrieved from the Internet: <URL: http://www.redback.com/en-US/whitepp/wp_supporting.html>. pp. 1-5.

*Mark E. Segal, "On-The-Fly Program Modification: Systems For Dynamic Updating", IEEE Software, IEEE Computer Society, Mar. 1993, vol. 10, No. 2, pp. 53-65.

*Data Sheet, SmartEdgeTM800 Router Network and Service Management, [online], [retrieved on May 13, 2003]. Retrieved from the Internet: <URL: http://www.redback.com/en-US/products/se-800-netop-ds.html>. pp. 1-5.

* cited by examiner

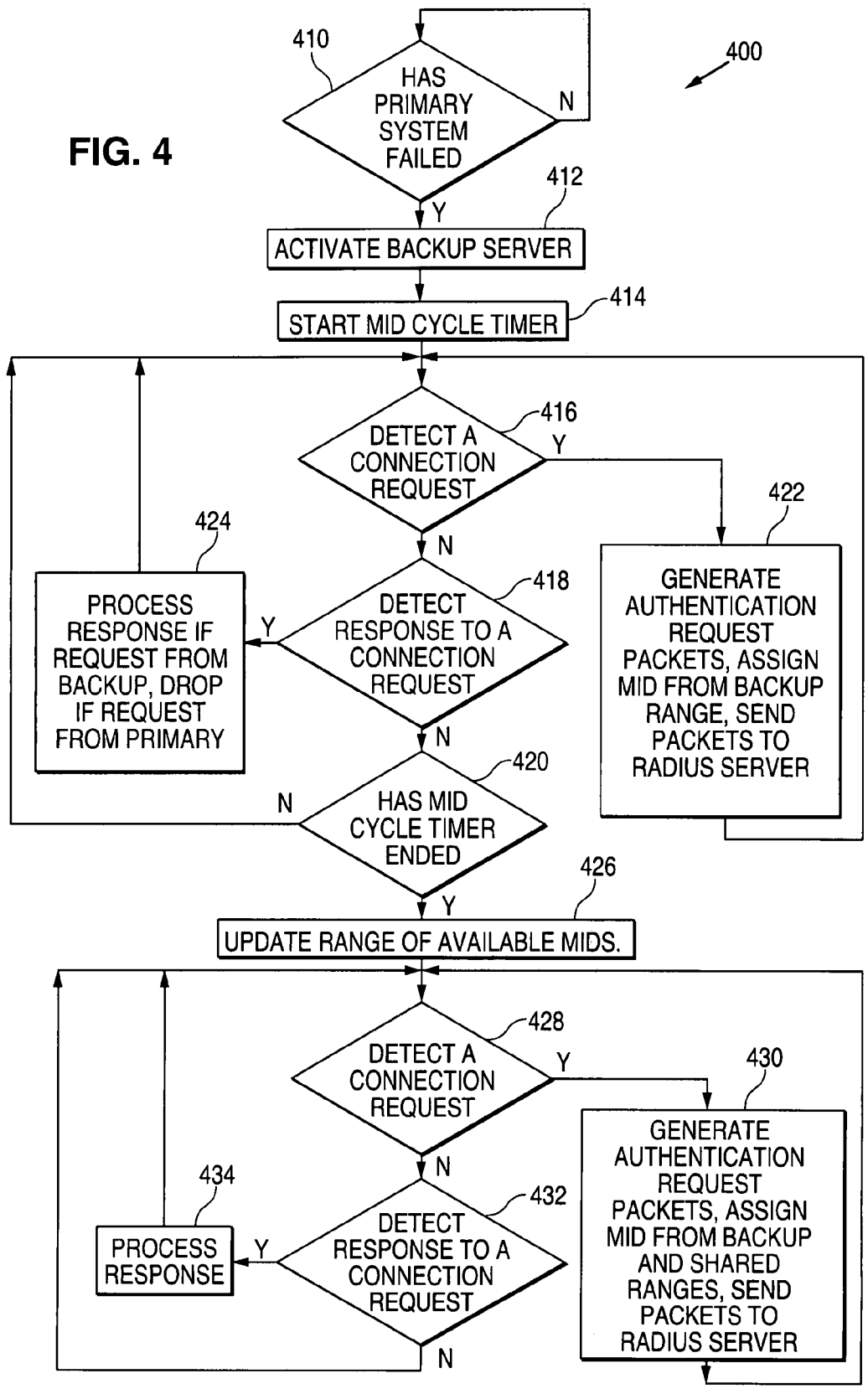

PRIMARY SERVER AND BACKUP SERVER THAT SHARE AN IP ADDRESS AND A LIMITED NUMBER OF MESSAGE IDENTIFIERS

The present application is a continuation of application Ser. No. 10/440,775 filed on May 19, 2003, now U.S. Pat. No. 7,228,459, issued on Jun. 5, 2007.

BACKGROUND OF THE INVENTION

1. Field of the Invention

The present invention relates to a primary server and a backup server and, more particularly, to a primary server and a backup server that share an IP address and a limited number of message identifiers.

2. Description of the Related Art

The Remote Access Dial In User Service (RADIUS) protocol, which is described in Request for Comments (RFC) 2138, C. R. Livingston et al., April 1997, defines a procedure for sending authentication, authorization, and accounting information in a subscriber management system between a network access server executing RADIUS client software, and a remote authentication server executing RADIUS server software.

For example, the central office of a telephone company can include a network access server, known as a control module, which executes the RADIUS client software. The network access server is connected to a number of xDSL line cards in the central office which, in turn, are connected to customer premise equipment (CPE) at a number of customer premises. The CPE at a customer premise commonly includes an xDSL modem that is connected to an xDSL line card in the central office, and a personal computer that is connected to the xDSL modem.

The RADIUS client software includes a method that detects an authentication request. In the above example, a Point-to-Point Protocol (PPP) manager running on an xDSL line card can send an authentication request to the RADIUS client on the network access server in response to a request from a personal computer.

The RADIUS client detects the authentication request from the line card, and constructs a RADIUS authentication request packet that includes, for example, the user name and password. The RADIUS client assigns a message identifier (MID) to the authentication request, and then sends the RADIUS authentication request packet to the RADIUS server.

The MID is used to identify the authentication request information during processing, and the configuration data that is returned when the connection request is approved. Only a limited number of MIDs, such as 256, are available per internet protocol (IP) address with a RADIUS client.

The RADIUS server authenticates the user name and password, determines the level of service that the account is authorized to have, e.g., parental controls can vary the level of service, and then sends an authentication request accept packet, along with the configuration information that is needed to provide the service to the user, to the RADIUS client.

Alternately, if the RADIUS server is unable to authenticate the user name and password, the RADIUS server returns an authentication request reject packet back to the RADIUS client. In response, the RADIUS client sends the authentication results to the PPP manager on the line card.

In a fault-tolerant communications computing system, fault tolerance is often provided by utilizing a primary server with a backup server that takes over when the primary server fails. The primary server and the backup server can be configured a number of different ways, depending on how much information can be lost when the primary server fails.

In one approach, the primary server and the backup server are identical hardware systems that are run in parallel. In this case, both the primary and backup servers receive and process the same input data, but the output data of the backup server is discarded until the primary server fails. Although quite effective in providing redundancy, this approach tends to be expensive because of the amount of hardware duplication that is required.

In another approach, the primary server continuously updates the backup server on the tasks that the primary server is handling. In this approach, known as dynamic updating, when the primary server fails, the backup server can take over without losing data because the backup server is aware of the tasks being performed by the primary server.

One drawback of this approach, however, is that continuous updating scales poorly because as the number of updates increases, the overhead (the amount of the processing resources of the primary server consumed by the updates) increases as well. Thus, this approach is difficult to implement on a large-scale subscriber management system.

In a further approach, rather than continuously updating the backup server, the primary server periodically updates the backup server on the results of the tasks that the primary server is handling. Periodic notification requires less overhead to implement, but allows an amount of data to be lost. With periodic notification, when the primary server fails, data from the last update to the time of failure is lost.

In an additional approach, known as cold start, the primary server provides no updates to the backup server during normal operation. This "share nothing" approach is the least complex solution to implement, but the time required for the backup server to come up, which can be on the order of minutes, means that more data is lost as control moves from the primary server to the backup server. In some applications, however, the least complex solution is the preferred solution because the loss of data during this period can be tolerated.

FIG. 1 shows a block diagram that illustrates a conventional cold-start, RADIUS-based communications network 100. As shown in FIG. 1, communications network 100 includes a number of customer premises equipment (CPE) 110, e.g., a modem and personal computer (PC), an xDSL line card 112 that is connected to the CPE 110, and a network access system 114 that is connected to xDSL line card 112.

Network access system 114, in turn, includes a primary server 114A with a first IP address, and a backup server 114B with a second IP address that is connected to primary server 114A. Primary server 114A and backup server 114B both execute the RADIUS client software, and backup server 114B receives a failure signal FLS from primary server 114A when primary server 114A fails.

As further shown in FIG. 1, communications network 100 includes an authentication server (RADIUS server) 116 that is connected to the primary and backup servers 114A and 114B. RADIUS server 116 is a shared resource. As a result, RADIUS server 116 is connected to a large number of RADIUS clients in addition to servers 114A and 114B.

In operation, primary server 114A generates authentication request packets in response to a request, such as a request from a PPP manager running on xDSL line card 112, assigns a MID to the authentication request packets, and sends the packets to RADIUS server 116. RADIUS server 116 authenticates the user name and password, determines the level of service, and then sends the configuration information with the MID to primary server 114A.

When primary server 114A fails, primary server 114A sends the failure signal FLS to backup server 114B which, in turn, assumes control. Once backup server 114B has assumed control, backup server 114B generates authentication request packets in response to a request, assigns a MID to the authentication request packets, and sends the packets to RADIUS server 116.

One drawback of the approach illustrated in FIG. 1 is that the primary server and the backup server each require a separate IP address. Thus, there is a need for an apparatus and method that provide a primary server and a backup server that both support a RADIUS client and share an IP address.

SUMMARY OF THE INVENTION

A method of operating a network access system is disclosed in accordance with a first embodiment of the present invention. The method is to receive a connection request, and generate authentication request information in response to receiving the connection request. The method is also to assign a message identifier to the authentication request information to identify the authentication request information. The message identifier is assigned from a first range of identifiers or a second range of identifiers before a failure is detected, from a third range of identifiers for a period of time after the failure has been detected, and from the second range of identifiers or the third range of identifiers after the period of time has expired.

A method of operating a network access system is disclosed in accordance with a second embodiment of the present invention. The method is to receive a connection request, and generate authentication request information in response to receiving the connection request. The method is also to assign a message identifier to the authentication request information to identify the authentication request information. The message identifier is assigned from a first range of identifiers, a second range of identifiers, or a third range of identifiers based on whether a failure has been detected.

A machine-readable medium is disclosed in accordance with a third embodiment of the present invention. The machine-readable medium has stored thereon sequences of instructions. The sequences of instructions include instructions which, when executed by a processor in a backup system, cause the processor to perform receiving a connection request, generating authentication request information in response to receiving the connection request, and assigning a message identifier to the authentication request information to identify the authentication request information. The message identifier is assigned from a first range of identifiers, a second range of identifiers, or a third range of identifiers based on whether a failure has been detected.

A network access system is disclosed in accordance with a fourth embodiment of the present invention. The system includes a table to store a number of message identifiers. The number of message identifiers includes a first range of identifiers, a second range of identifiers, and a third range of identifiers. The network access system also includes a system that is connected to the table. The system is to receive a connection request, generate authentication request information in response to receiving the connection request, and assign a message identifier to the authentication request information to identify the authentication request information. The message identifier is assigned from the first range of identifiers or the second range of identifiers until a failure is detected, from the third range of identifiers for a period of time after the failure has been detected, and from the second range of identifiers or the third range of identifiers after the period of time has expired.

A better understanding of the features and advantages of the present invention will be obtained by reference to the following detailed description and accompanying drawings that set forth an illustrative embodiment in which the principles of the invention are utilized.

BRIEF DESCRIPTION OF THE DRAWINGS

FIG. 4 is a flow chart illustrating an example of a method 400 of operating backup server 214B in accordance with the present invention.

DETAILED DESCRIPTION OF THE INVENTION

Figure 1:
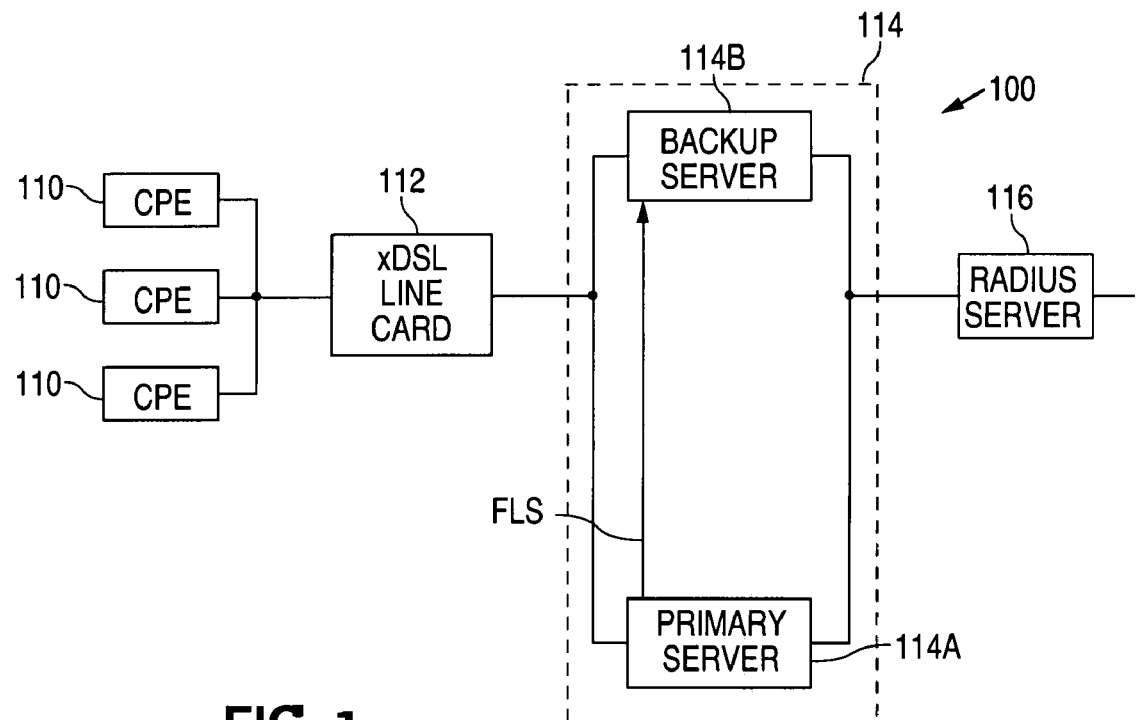
FIG. 1 is a block diagram illustrating a conventional cold-start, RADIUS-based communications network 100.
Figure 2:
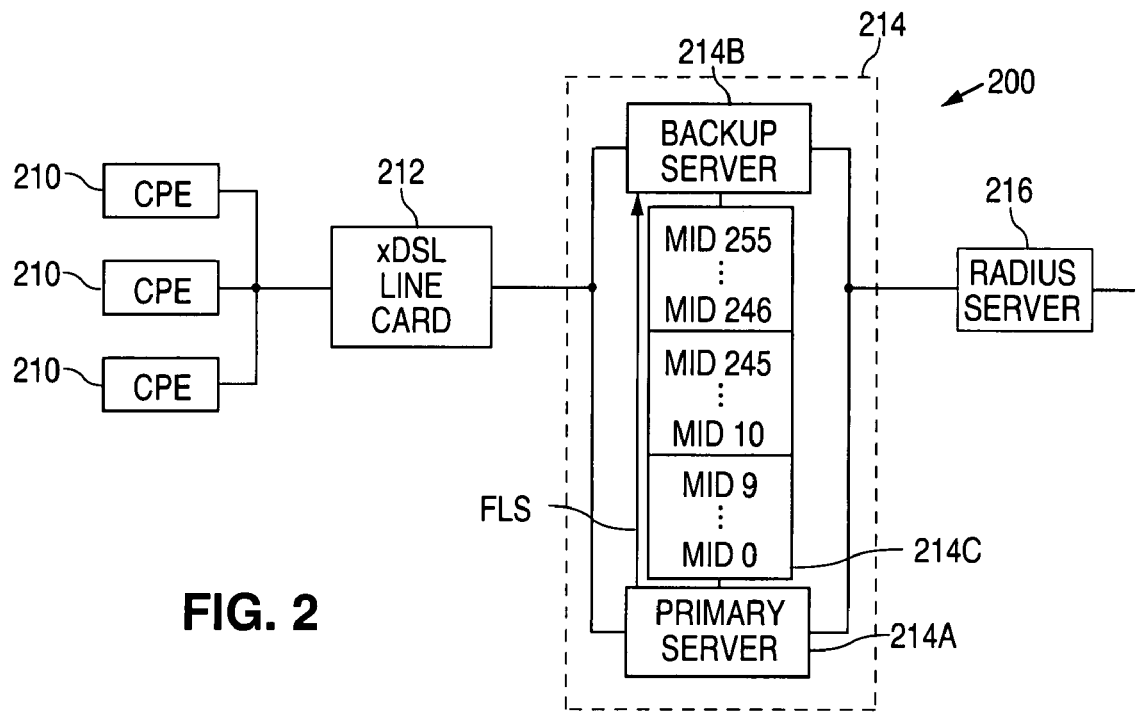
FIG. 2 is a block diagram illustrating an example of a cold-start, RADIUS-based communications network 200 in accordance with the present invention.

FIG. 2 shows a block diagram that illustrates an example of a cold-start, RADIUS-based communications network 200 in accordance with the present invention. As shown in FIG. 2, communications network 200 includes a number of customer premises equipment (CPE) 210, e.g., a modem and personal computer (PC), an xDSL line card 212 that is connected to the CPE 210, and a network access system 214 that is connected to xDSL line card 212.

Network access system 214, in turn, includes a primary server 214A and a backup server 214B that is connected to primary server 214A. Primary server 214A and backup server 214B both execute the RADIUS client software, and backup server 214B receives a failure signal FLS from primary server 214A when primary server 214A fails.

In addition, primary server 214A and backup server 214B share one IP address. As a result, servers 214A and 214B must share a limited number of message identifiers (MIDs), e.g., 256. (As noted above, MIDs are used to identify the authentication request information during processing, and the configuration data that is returned when the connection request is approved.)

Figure 3:
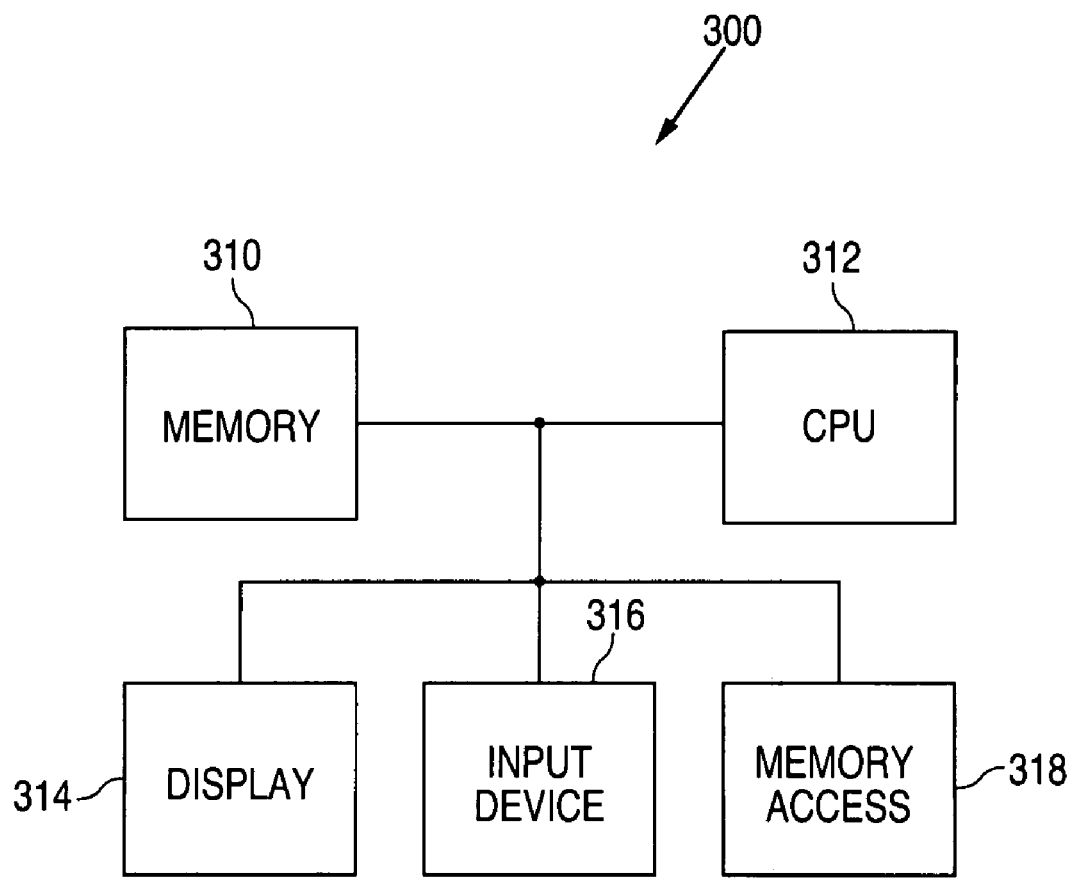
FIG. 3 is a block diagram illustrating an example of a backup server 300 in accordance with the present invention.

FIG. 3 shows a block diagram that illustrates an example of a backup server 300 in accordance with the present invention. As shown in FIG. 3, backup server 300 includes a memory 310 that stores programs and data. The programs include an operating system and a set of RADIUS-client program instructions. The operating system can be implemented with, for example, the Linux operating system, although other operating systems can alternately be used. The program instructions can be written in, for example, C++ although other languages can alternately be used.

Further, backup server 300 includes a central processing unit (CPU) 312 that is connected to memory 310. CPU 312, which can be implemented with, for example, a 32-bit processor, operates on the data in response to the program instructions. Although only one processor is described, the present invention can be implemented with multiple processors in parallel to increase the capacity to process large amounts of data.

In addition, backup server 300 includes a display system 314 that is connected to CPU 312. Display system 314, which can be remotely located, allows images to be displayed to the user which are necessary for the user to interact with the program. Backup server 300 also includes a user-input system 316, such as a keyboard and mouse, which is connected to CPU 312. Input system 316, which can be remotely located, allows the user to interact with the program.

Further, backup server 300 includes a memory access device 318, such as a disk drive or a networking card, which is connected to memory 310 and CPU 312. Memory access device 314 allows the processed data from memory 310 or CPU 312 to be transferred to an external medium, such as a disk or a networked computer. In addition, device 318 allows the program instructions to be transferred to memory 310 from the external medium. Some of the elements of backup server 300 are shared with primary server 212A.

Referring again to FIG. 2, network access system 214 also includes a message identifier (MID) table 214C that is connected to primary and backup servers 214A and 214B. In this example, MID table 214C includes an entry for each MID, and a pointer that points to the next available MID in the table. In the present invention, MID table 214C is divided into three ranges: a primary range, a backup range, and a shared range. (Four and more ranges can alternately be used.)

The primary and backup ranges are relatively small ranges including, for example, 10 MIDs, while the shared range is substantially larger including, for example, 236 MIDs. For example, the primary range can include MIDs from the 0-to-9 range, the shared range can include MIDs from the 10-to-245 range, and the backup range can include MIDs from the 246-to-255 range.

As further shown in FIG. 2, communications network 200 includes an authentication server (RADIUS server) 216 that is connected to network access system 214 (UDP/IP is used for communication between the RADIUS server and the RADIUS client). Although not shown, RADIUS server 216 is a shared resource that is connected to a large number of RADIUS clients in addition to the RADIUS clients supported by the primary and backup servers 214A and 214B.

In the present invention, during normal operation, primary server 214A utilizes both the primary range of MIDs and the shared range of MIDs. As a result, primary server 214A generates authentication request packets in response to a request, such as a request from a PPP manager running on xDSL line card 212, assigns a MID from the 0-to-245 range to the authentication request packets, and sends the packets to RADIUS server 216. RADIUS server 216 authenticates the user name and password, determines the level of service, and then sends the configuration information with the MID to primary server 214A.

When primary server 214A fails, primary server 214A notifies backup server 214B of the condition via the failure signal FLS. Backup server 214B, in turn, assumes control in response to the failure signal FLS. Backup server 214B can have a number of states prior to receiving the failure signal FLS. For example, backup server 214B can be turned off, with the failure signal FLS functioning as a turn on signal.

Alternately, backup server 214B can be in a sleep mode, with the failure signal FLS functioning as a wake up signal. Backup server 214B can alternately receive and process information from both line card 212 (multi-injected messages) and RADIUS server 216, where the outputs from backup server 214B are discarded until backup server 214B is notified by receipt of the failure signal FLS.

FIG. 4 shows a flow chart that illustrates an example of a method 400 of operating backup server 214B in accordance with the present invention. In the FIG. 4 example, 256 MIDs are available with a first range including 0-to-9, a shared range including 10-245, and a backup range including 246-255. In addition, the primary server initially uses the primary and shared ranges (the first 245 MIDs (0-to-245)), and the backup server initially uses the backup range (the last 10 MIDs (246 to 255)).

As shown in FIG. 4, method 400 begins at step 410 by determining whether the primary server has failed. When the primary server fails (as indicated by the failure signal FLS), the method moves to step 412 to activate (turn on, wake up, notify) the backup server to assume control.

After the backup server has been activated, method 400 moves to step 414 to start a MID cycle timer. The MID cycle timer measures the amount of time required for the MIDs assigned by primary server 214A to be processed out of RADIUS server 216. At some point after the failure, RADIUS server 216 will send a last message that includes a primary-server-assigned MID. After this, RADIUS server 216 performs no further tasks for any requests that are identified by a primary-server-assigned MID.

Thus, once RADIUS server 216 performs no further tasks for any requests that are identified by a primary-server-assigned MID, the MIDs are available to be used again. The MID cycle timer is set to a predefined value that indicates when the MIDs assigned by primary server 214A have been processed out of RADIUS server 216 and are available to be used again.

After starting the MID cycle timer, method 400 moves to step 416 to detect a connection request. If a connection request is not detected, method 400 moves to step 418 to detect (via the IP address) if a response to a connection request has been received from RADIUS server 216.

If a response has not been received, method 400 moves to step 420 to detect if the MID cycle timer has expired. If the MID cycle timer has not expired, method 400 returns to step 416 and continues to loop until a connection request is received, a response to a connection request is received, or the MID cycle timer expires.

When a connection request is received, method 400 moves from step 416 to step 422 to generate authentication request packets, assign a MID from the backup range (246-to-255) to the authentication request packets, and send the packets to RADIUS server 216. Method 400 then returns to step 416.

When a response to a connection request is received (the IP address matches), method 400 moves from step 418 to step 424. In step 424, backup server 214B determines whether the MID associated with the information from RADIUS server 216 was assigned by server 214A or 214B (since both servers share the same IP address).

When the MID was assigned by primary server 214A, the response is dropped. When the MID was assigned by backup server 214B, the response is processed (server 214B passes the information along to the requesting device, e.g., the PPP manager on a line card). Method 400 then returns to step 416.

When the MID cycle timer expires, method 400 moves from step 420 to step 426 to change the range of MIDs that can be assigned to connection requests from only the backup range to include both the backup and shared ranges, e.g., from only MIDs 246-255 to MIDs 10-255.

After the available range of MIDs has been updated, method 400 moves to step 428 to detect a connection request. When a connection request is received, method 400 moves to step 430 to generate authentication request packets, assign a MID from the backup and shared ranges (10-to-255) to the authentication request packets, and send the packets to RADIUS server 216. Method 400 then returns to step 428.

If a connection request is not detected, method 400 moves to step 432 to detect (via the IP address) if a response to a connection request has been received from RADIUS server 216. If a response has been received, method 400 moves to step 434 to process the response (server 214B passes the information along to the requesting device, e.g., the PPP manager on a line card). Method 400 then returns to step 428. If no response has been received, method 400 returns to step 428 and continues to loop until a connection request is received, or a response to a connection request is received.

Thus, by measuring the time required for the MIDs assigned by the primary server to be processed out of the RADIUS server, and then adjusting the range of MIDs that are available to the backup server, the present invention provides a method of sharing a single IP address with both the primary server and the backup server.

In addition to reducing the number of IP address that must be used, the software used to control the primary and backup servers 214A and 214B can be substantially identical because network 200 operates in a cold-start mode, thereby simplifying the design. Further, rather than using software and a processor that executes the software to implement method 400, state machines can alternately used to control the primary and backup servers 214A and 214B. Since network 200 operates in a cold-start mode, the state machines can also be substantially identical.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of operating a network access system comprising:
   receiving a connection request;
   generating authentication request information in response to receiving the connection request; and
   assigning a message identifier to the authentication request information to identify the authentication request information, the message identifier being assigned from a first range of identifiers or a second range of identifiers before a failure is detected, from a third range of identifiers for a period of time after the failure has been detected, and from the second range of identifiers or the third range of identifiers after the period of time has expired.

2. The method of claim 1 wherein the authentication request information includes a user name and a password.

3. The method of claim 1 wherein the first, second, and third ranges of identifiers are non-overlapping.

4. The method of claim 1 wherein the second range of identifiers is substantially larger than the first range of identifiers, and substantially larger than the third range of identifiers.

5. The method of claim 1 and further comprising forwarding the authentication request information and the message identifier on to an authentication server.

6. The method of claim 1 wherein the network access system includes a primary server and a backup server, and the failure is a failure of the primary server.

7. The method of claim 6 wherein the primary and backup servers both generate authentication request information in response to receiving connection requests, and assign message identifiers to identify the authentication request information, the primary server assigning message identifiers from the first range of identifiers and the second range of identifiers prior to the failure, the backup server assigning message identifiers from the third range of identifiers for the period of time after the failure has been detected, and from the second range of identifiers and the third range of identifiers after the period of time has expired.

8. The method of claim 7 wherein the primary server and the backup server share a single internet protocol (IP) address.

9. The method of claim 7 and further comprising:
   detecting a failure in the primary server;
   starting a timer to measure the period of time after the failure has been detected.

10. A method of operating a network access system comprising:
    detecting a response to a connection request, the response including a message identifier;
    when the response is detected during a predetermined period of time that begins with a failure of a primary server, dropping the response if the message identifier was assigned by the primary server, a message identifier assigned by the primary server lying within a range of message identifiers; and
    when the response is detected after the predetermined period of time, forwarding information from the response if the message identifier falls within the range of message identifiers.

11. The method of claim 10 wherein the range of message identifiers is shared by the primary server and a backup server.

12. The method of claim 10 and further comprising when the response is detected during the predetermined period of time, forwarding information from the response if the message identifier falls outside of the range of message identifiers, and within a group of backup message identifiers.

13. The method of claim 10 and further comprising assigning the message identifier from outside the range of message identifiers, and within a group of backup message identifiers, to a connection request to identify the connection request during the predetermined period of time.

14. The method of claim 10 and further comprising assigning the message identifier from within the range of message identifiers to a connection request to identify the connection request after the predetermined period of time.

15. The method of claim 10 and further comprising forwarding the connection request with the message identifier to an authentication server.

16. A method of operating a network access system comprising:
    receiving a connection request;
    generating authentication request information in response to receiving the connection request;
    assigning a message identifier to the authentication request information to identify the authentication request information, the message identifier being assigned from a first range of identifiers, a second range of identifiers, or a third range of identifiers based on whether a failure has been detected;
    detecting the failure; and
    starting a timer to measure a period of time after the failure has been detected.

17. The method of claim 16 wherein the message identifier is assigned from the third range of identifiers for the period of time after the failure has been detected, and from the second range of identifiers or the third range of identifiers after the period of time has expired.

18. A machine-readable medium having stored thereon sequences of instructions, the sequences of instructions including instructions which, when executed by a processor in a backup system, causes the processor to perform:

detecting a response to a connection request, the response including a message identifier when the response is detected during a predetermined period of time that begins with a failure of a primary server, dropping the response if the message identifier was assigned by the primary server, a message identifier assigned by the primary server lying within a range of message identifiers; and when the response is detected after the predetermined period of time, forwarding information from the response if the message identifier falls within the range of message identifiers.

19. The machine-readable medium of claim 18 wherein the range of message identifiers is shared by the primary server and a backup server.

20. The machine-readable medium of claim 18 wherein the sequence of instructions cause the processor to perform when the response is detected during the predetermined period of time, forwarding information from the response if the message identifier falls outside of the range of message identifiers, and within a group of backup message identifiers.

21. The machine-readable medium of claim 18 wherein the sequence of instructions cause the processor to perform assigning the message identifier from outside the range of message identifiers, and within a group of backup message identifiers, to a connection request to identify the connection request during the predetermined period of time.

22. The machine-readable medium of claim 18 wherein the sequence of instructions cause the processor to perform assigning the message identifier from within the range of message identifiers to a connection request to identify the connection request after the predetermined period of time.

23. The machine-readable medium of claim 18 wherein the sequence of instructions cause the processor to perform forwarding the connection request with the message identifier to an authentication server.

24. A machine-readable medium having stored thereon sequences of instructions, the sequences of instructions including instructions which, when executed by a processor in a backup system, causes the processor to perform:
receiving a connection request;
generating authentication request information in response to receiving the connection request;
assigning a message identifier to the authentication request information to identify the authentication request information, the message identifier being assigned from a first range of identifiers, a second range of identifiers, or a third range of identifiers based on whether a failure has been detected;
detecting the failure; and
starting a timer to measure a period of time after the failure has been detected.

25. The machine-readable medium of claim 24 wherein the message identifier is assigned from the third range of identifiers for the period of time after the failure has been detected, and from the second range of identifiers or the third range of identifiers after the period of time has expired.

26. A network access system comprising:
a table to store a number of message identifiers, the number of message identifiers including a first range of identifiers, a second range of identifiers, and a third range of identifiers; and
a system connected to the table, the system to receive a connection request, generate authentication request information in response to receiving the connection request, and assign a message identifier to the authentication request information to identify the authentication request information, the message identifier being assigned from the first range of identifiers or the second range of identifiers until a failure is detected, from the third range of identifiers for a period of time after the failure has been detected, and from the second range of identifiers or the third range of identifiers after the period of time has expired.

27. The network access system of claim 26 wherein the authentication request information includes a user name and a password.

28. The network access system of claim 26 wherein the first, second, and third ranges of identifiers are non-overlapping.

29. The network access system of claim 26 wherein the second range of identifiers is substantially larger than the first range of identifiers, and substantially larger than the third range of identifiers.

30. The network access system of claim 26 wherein the network access system includes a primary server and a backup server that are both connected to the table, and the failure is a failure of the primary server.

31. The network access system of claim 30 wherein the primary and backup servers both generate authentication request information in response to receiving connection requests, and assign message identifiers to the authentication request information to identify the authentication request information, the primary server assigning message identifiers from the first range of identifiers and the second range of identifiers prior to the failure, the backup server assigning message identifiers from the third range of identifiers for the period of time after the failure has been detected, and from the second range of identifiers and the third range of identifiers after the period of time has expired.

32. The network access system of claim 31 wherein the primary server and the backup server share a single internet protocol (IP) address.

33. The network access system of claim 31 wherein the backup server starts a timer to measure the period of time after the failure has been detected.

* * * * *

UNITED STATES PATENT AND TRADEMARK OFFICE
CERTIFICATE OF CORRECTION

PATENT NO. : 7,472,313 B2
APPLICATION NO. : 11/717404
DATED : December 30, 2008
INVENTOR(S) : Jiang et al.

It is certified that error appears in the above-identified patent and that said Letters Patent is hereby corrected as shown below:

Title Page, Item (56), References Cited, U.S. PATENT DOCUMENTS, Page 2, Column 1, insert --7,206,826 B1* 04/2007 Parker et al. 709/220--.

Column 8, lines 19-20, delete "was assigned by the primary server, a message identifier assigned by the primary server lying" and replace with --falls--.

Column 9, lines 6-7, delete "was assigned by the primary server, a message identifier assigned by the primary server lying" and replace with --falls--.

Signed and Sealed this

Tenth Day of February, 2009

JOHN DOLL
*Acting Director of the United States Patent and Trademark Office*